United States Patent [19]
Horikawa et al.

[11] Patent Number: 5,822,320
[45] Date of Patent: Oct. 13, 1998

[54] ADDRESS RESOLUTION METHOD AND ASYNCHRONOUS TRANSFER MODE NETWORK SYSTEM

[75] Inventors: Koichi Horikawa; Atsushi Iwata, both of Tokyo, Japan

[73] Assignee: NEC Corporation, Japan

[21] Appl. No.: 746,922

[22] Filed: Nov. 18, 1996

[30] Foreign Application Priority Data

Nov. 20, 1995 [JP] Japan ................................ 7-301000

[51] Int. Cl.⁶ .................................................. H04L 12/56
[52] U.S. Cl. ........................... 370/396; 370/401; 370/254
[58] Field of Search ..................................... 370/238, 395, 370/396, 397, 398, 399, 401, 402, 469, 254, 255, 410, 409

[56] References Cited

U.S. PATENT DOCUMENTS

| | | | |
|---|---|---|---|
| 5,583,862 | 12/1996 | Callon ..................................... | 370/397 |
| 5,600,644 | 2/1997 | Chang et al. ........................... | 370/404 |
| 5,617,540 | 4/1997 | Civanlar et al. ................... | 395/200.57 |
| 5,699,347 | 12/1997 | Callon ..................................... | 370/238 |

OTHER PUBLICATIONS

D. Katz, et al., "NBMA Next Hop Resolution Protocol (NHRP)", Routing Over Large Clouds Working Group, Internet–Draft, <draft–ietf–rolc–nhrp–04.txt>, May 1995, Expires Nov. 1995, pp. 1–36.

Primary Examiner—Min Jung
Attorney, Agent, or Firm—Ostrolenk, Faber, Gerb & Soffen, LLP

[57] ABSTRACT

An ATM terminal transmits an NHRP packet to an NHS based on an ANYCAST address thereof. A NHRP configuration server may be placed in the ATM network to hold NHS information in order to store the configuration, acquire an IP address and an ATM address of the NHS, and transmit the NHRP packet based on the acquired address. Each NHS is allowed to register its own information in the NHRP configuration server at a regular interval or when the information has been updated. When the NHS receives an NHRP register packet from an ATM terminal that is not managed thereby, the NHRP register packet is transferred to another NHS that manages the ATM terminal. The NHS may also execute authentication operation with respect to the NHRP register packet transferred from the ATM terminal that is managed thereby.

14 Claims, 7 Drawing Sheets

FIG.7A

NHRP SERVER TABLE OF NHS-1

| LIS | IP ADDRESS | ATM ADDRESS |
|---|---|---|
| LIS-A | IP-NHS-1 | ATM-NHS-1 |
| LIS-B | IP-NHS-2 | ATM-NHS-2 |
| LIS-C | IP-NHS-2 | ATM-NHS-2 |

FIG.7B

NHRP SERVER TABLE OF NHS-2

| LIS | IP ADDRESS | ATM ADDRESS |
|---|---|---|
| LIS-A | IP-NHS-1 | ATM-NHS-1 |
| LIS-B | IP-NHS-2 | ATM-NHS-2 |
| LIS-C | IP-NHS-3 | ATM-NHS-3 |

FIG.7C

NHRP SERVER TABLE OF NHS-3

| LIS | IP ADDRESS | ATM ADDRESS |
|---|---|---|
| LIS-A | IP-NHS-2 | ATM-NHS-2 |
| LIS-B | IP-NHS-2 | ATM-NHS-2 |
| LIS-C | IP-NHS-3 | ATM-NHS-3 |

ADDRESS RESOLUTION METHOD AND ASYNCHRONOUS TRANSFER MODE NETWORK SYSTEM

BACKGROUND OF THE PRESENT INVENTION

The present invention relates to an address resolution method using an NBMA Next Hop Resolution Protocol (hereinafter referred to as NHRP) on an Asynchronous Transfer Mode (hereinafter referred to as ATM) network connected to a plurality of ATM switches and ATM terminals and, more particularly, to address resolution which works properly irrespective of a physical movement of the NHRP server and the ATM terminal.

One of the conventional address resolutions on an ATM network uses an NHRP protocol. The Internet Engineering Task Force (hereinafter referred to as IETF) has developed the NHRP protocol and discloses its specification in the document "NBMA Next Hop Resolution Protocol (NHRP)", D. Katz and D. Piscitello,←, draft-ietf-rolc-nhrp-04. txt, May 1995, and the like.

The above-mentioned resolution method is explained as follows.

IP communication on the ATM network requires means for acquiring an ATM address from an IP address of a communicating party. For this purpose, in the NHRP protocol, an NHRP server (hereinafter referred to as an NHS) is allocated to each area (for example, each logical subnet, known as an LIS) distributes and manages pairs of an IP address and an ATM address of the ATM terminals connected to the ATM network.

When an ATM terminal is required to correlate an ATM address to an IP address of the communicating party, an NHRP request packet is transmitted to a predetermined NHS. When the NHS receiving the NHRP request packet is able to correlate the ATM address, the NHS returns an NHRP reply packet to the ATM terminal. When the NHS cannot correlate the ATM address, the NHRP request packet is transferred to another NHS. In this way, the NHRP request packet is transferred from one NHS to another NHS sequentially until the NHRP request packet reaches the NHS that can correlate the address.

The operation of the conventional address resolution method is explained referring to drawings.

FIG. 6 represents an example of an ATM network. It should be noted that the ATM switches forming the ATM network as well as the connection lines for connecting those ATM switches and the like are not shown in FIG. 6.

In FIG. 6, three LIS's (LIS-A, LIS-B, LIS-C) are defined in one ATM network. A different LIS number is allocated to each LIS. An IP address of an ATM terminal belonging to each LIS is defined to contain the corresponding LIS number. The LIS number contained by the IP address of a respective ATM terminal shows the LIS which handles the ATM terminal.

Furthermore three NHS's (NHS-1, NHS-2, NHS-3) are provided for the ATM network. Each NHS is preset to manage parts of an IP address and an ATM address of the ATM terminals belonging to the respective LIS's. In FIG. 6, the NHS-1 covers the LIS-A, the NHS-2 covers the LIS-B and the NHS-3 covers the LIS-C.

Each ATM terminal notifies an address pair comprised of its own IP address and ATM address at a regular interval or only when such information is updated by transmitting an NHRP register packet to the NHS which manages the ATM terminal. However, each NHS accepts only an NHRP register packet from the ATM terminal managed thereby. Therefore, each ATM terminal allocates a correct ATM address of the NHS which manages the corresponding ATM terminal.

Moreover, each NHS holds an NHRP server table that contains information as to which NHS an NHRP request should be transferred to in case the NHRP request to the ATM terminal belonging to a certain LIS cannot be resolved by the NHS. Each examples of the NHRP server tables of the respective NHS's is shown in FIG. 7(a) to 7(c).

In FIG. 6, it is assumed that an ATM terminal 1 is required to transmit any IP datagram to another ATM terminal 2. In this case, the ATM terminal 1 creates an NHRP request packet containing an IP address of the ATM terminal 2 and transmits the NHRP request packet to a preset NHS-1.

The NHS-1 receives the NHRP request packet. Because the NHS-1 holds no information on the ATM terminal 2, the NHRP server table thereof is referred to. An LIS number contained in the IP address of the ATM terminal 2 is used for retrieving the NHPP server table, and it is determined to "transfer the NHRP request packet to the NHS-2 for resolving the ATM address of the ATM terminal 2 belonging to the LIS-C". The NHS-1 then transfers the NHRP request packet to the NHS-2.

The NHS-2 receives the NHRP request packet. The NHS-2 holds no information on the ATM terminal 2, the NHRP server table thereof is referred to, and it is determined to "transfer the NHRP request packet to the NHS-3 for resolving the ATM address of the ATM terminal 2 belonging to the LIS-C". The NHS-2 then transfers the NHRP request packet to the NHS-3.

The NHS-3 receives the NHRP request packet. Because the NHS-3 holds the information on the ATM terminal 2, the NHS-3 creates an NHRP reply packet containing the ATM address of the ATM terminal 2 and then transfers the NHRP replay packet to the ATM terminal 1.

When the ATM terminal 1 receives the NHRP reply packet, the ATM terminal 1 acquires the ATM address of the ATM terminal 2. As a result, an VC is established based on the acquired ATM address, and the desired IP datagram can be supplied to the VC.

The conventional address resolution method using the conventional NHRP protocol has the problem that, when an ATM address of an NHS has been changed for some reason owing to a physical movement of the NHS to the other ATM switch, the ATM terminal fails to transmit an NHRP register packet and an NHRP request packet to the NHS. Consequently a new ATM address of the physically moved NHS should be sent to all of the ATM terminals managed by the NHS.

To avoid the above-mentioned problem, a functional address (ANYCAST address) of the NHS provided by the ATM network is allocated to the ATM terminal in place of the ATM address of the NHS. The ANYCAST address can be used for transmitting an NHRP register packet or an NHRP request packet. The ANYCAST address refers to a special ATM address allocated to each type of the server that provides a particular service. The locations of the ANYCAST address and of the servers providing services based on the ANYCAST address are automatically set by exchanging information between the server and the respective ATM switches. A plurality of servers providing services can be set within one ATM network. In this case, when an ATM switch receives a request from the ATM terminal to allocate an VC to a server based on the ANYCAST address, the ATM switch executes routing to "establish the VC to the nearest server". As a result, the VC is established to the nearest server.

For example, it is assumed that the ANYCAST address of an NHS has been preset. It is intended to establish the VC based on the ANYCAST address so that the ATM terminal accesses the NHS. Receiving the request from the ATM terminal, the ATM switch establishes the VC to the nearest NHS.

In the above-mentioned procedure, even if the NHS has been physically moved, the ATM terminal is allowed to ignore such a change completely.

However, as explained above, the ANYCAST address can access the nearest NHS only. As a result, when an ATM terminal has been physically moved, the NHS that can be accessed based on the ANYCAST address differs from the NHS that manages the physically moved ATM terminal. At this time, when the ATM terminal transmits an NHRP register packet based on the ANYCAST address, the NHS which does not manage the physically moved ATM terminal may receive the NHRP register packet. Accordingly this NHS judges the received as an error, thereby discarding information on the ATM terminal. The NHS that manages this ATM terminal also cannot get the ATM terminal information. The physically moved ATM terminal thus no longer communicates with other ATM terminals via the ATM network.

Furthermore, a method for authenticating the access of the physically moved ATM terminal to the ANYCAST address has not been established.

SUMMARY OF THE INVENTION

It is an object of the present invention to solve the aforementioned problem.

It is another object of the present invention to provide an art for address resolution which can work effectively irrespective of a physical movement of an ATM terminal on an ATM network.

The present invention is achieved by an address resolution method using an NHRP on an ATM network connected to a plurality of ATM switches and ATM terminals comprising: a step where an ATM terminal connected to the ATM network transmits an NHRP register packet to any NHRP server; and a step where the NHRP server receives the NHRP register packet from the ATM terminal and transfers the received register packet to other NHRP server that manages the ATM terminal.

When an NHRP server receives a register packet from an ATM terminal which is not managed thereby, the NHRP server transfers the received register packet to the NHRP server which manages the ATM terminal.

An NHRP configuration server is provided so as to hold information on ATM addresses and the corresponding logical subnet numbers of all NHRP servers connected to an ATM network. An ATM terminal is allowed to acquire an ATM address of an NHRP server which manages the ATM terminal through accessing the above NHRP configuration server.

A plurality of NHRP configuration servers can be provided so as to hold the information on ATM addresses and the corresponding logical subnet numbers of all NHRP servers in a distribution manner. When the ATM terminal accesses to the NHRP configuration server, a pair of an IP address and an ATM address of any one of NHRP servers is transmitted to the ATM terminal. Then the ATM terminal transmits an NHRP register packet to the NHRP server specified with those acquired IP address and ATM address. When the NHRP server receives the NHPP register packet from the ATM terminal not managed thereby, the NHRP server transfers the received NHRP register packet to the other NHPP server which manages the ATM terminal.

The above-described construction allows the address resolution to effectively work irrespective of a physical movement of the ATM terminal on the ATM network.

It can be so constructed that the ATM terminal transmits authentication information accompanied with the NHRP register packet which allows the NHRP server managing the ATM terminal to have authentication with the authentication information. The NHRP register packet is discarded when an error is detected. This realizes a correct authentication even when a physically moved ATM terminal attempts to access the NHS based on the ANYCAST address.

BRIEF DESCRIPTION OF THE DRAWINGS

This and other objects, features and advantages of the present invention will become more apparent upon a reading of the following detailed description and drawings, in which:

FIGS. 7A to 7C show examples of the respective NHRP server tables.

DESCRIPTION OF THE PREFERRED EMBODIMENT

Figure 1:
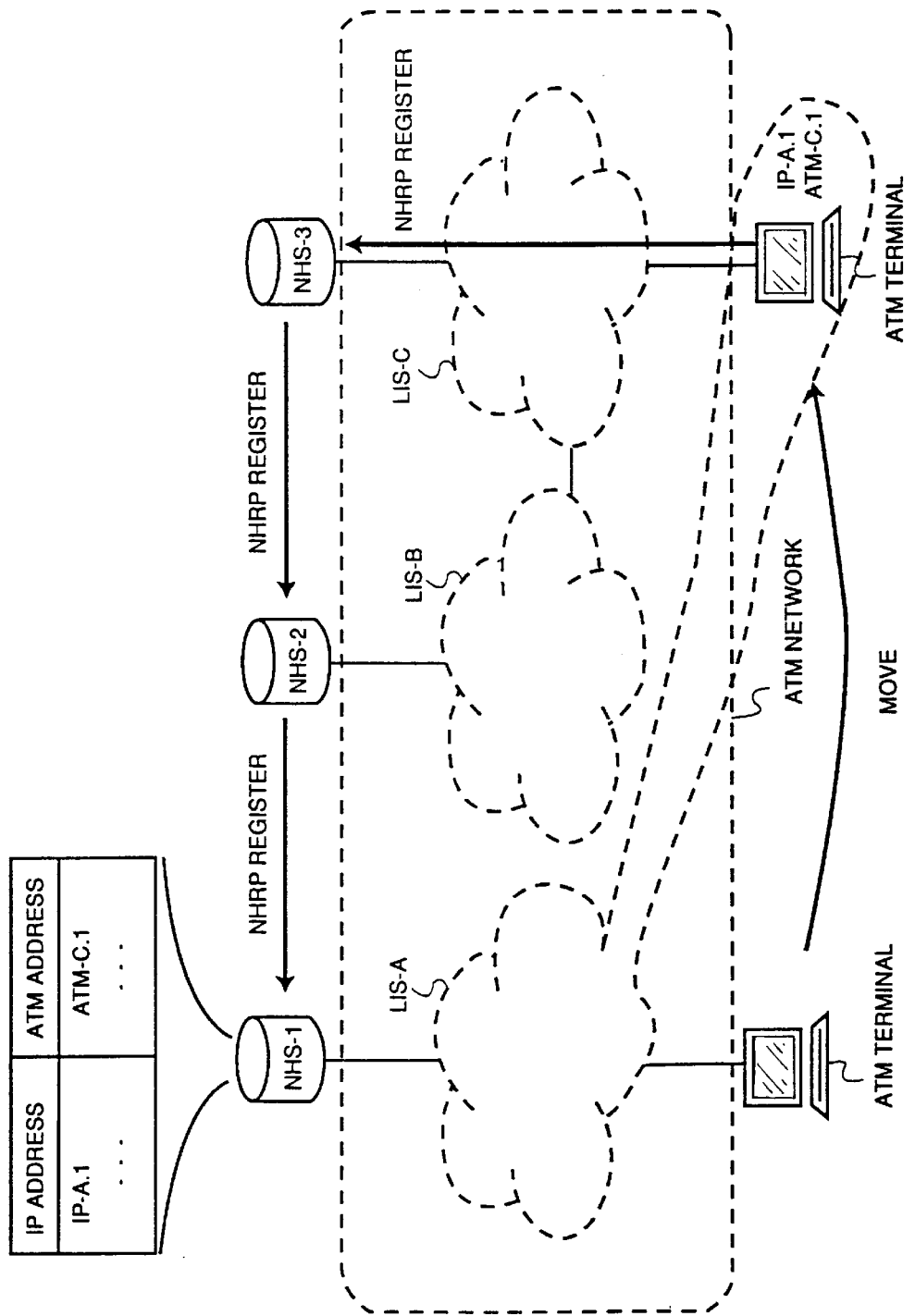
FIG. 1 shows a first embodiment of the invention.

The present invention is explained referring to the drawings.

In FIG. 1 to FIG. 5, it is assumed that a plurality of LIS's are defined in one ATM network. The ATM switches forming the ATM network and the connection lines connecting those ATM switches are not shown in each figure. The NHS-1 to the NHS-4 are NHRP servers. It is predetermined that the NHS-1 covers the LIS-A, the NHS-2 covers the LIS-B, the NHS-3 covers the LIS-C and the NHS-4 covers the LIS-D, respectively. Each NHS holds an NHRP server table containing information as to which NHS an NHRP request should be transferred when the present NHS cannot correlate the NHRP request to an ATM terminal belonging to a respective LIS. The contents of the respective NHRP server tables are omitted. An ATM terminal shown in each figure is connected to the ATM network, and its IP address is set to belong to, for example, the LIS-A. In FIG. 2 to FIG. 5, the NHRP configuration servers 1 and 2 hold information on "an IP address, an ATM address and an LIS managed by the NHS".

First, a first embodiment is explained.

In FIG. 1, an ANYCAST address of an NHS is assumed to be specified.

The operation when an ATM terminal is connected to a switch belonging to the LIS-A is now explained.

The ATM terminal transmits an NHPP register packet to an NHS based on the ANYCAST address. In this case, the NHRP register packet reaches the nearest NHS, namely NHS-1. The NHS-1 receives and accepts the NHRP register packet because the NHRP register packet has been transmitted from the ATM terminal managed by the NHS-1. The NHS-1 then registers a pair comprised of an IP address and an ATM address derived from the NHRP register packet in its cache in preparation for an inquiry subsequently made by other ATM terminals.

When the ATM terminal is required to resolve an address of a communicating party, the ATM terminal transmits an NHRP request packet to an NHS based on the ANYCAST address. The subsequent processing of the NHRP request packet is executed in the same manner as described in the prior art.

Next, the operation when the ATM terminal has been moved, for example, to a switch belonging to the LIS-C, but the ATM terminal is still identified as belonging to the LIS-A is explained.

The ATM terminal transmits an NHRP register packet to an NHS based on the ANYCAST address. In this case, the NHRP register packet is transmitted to the nearest namely NHS-3. Receiving the NHRP register packet, the NHS-3 rejects the NHRP register packet that has not been transmitted by the ATM terminal managed thereby. The NHS-3 refers to its NHRP server table to transfer the NHRP register packet to the NHS that manages the ATM terminal (or to a NHS nearer to the NHS that manages the ATM terminal). The NHRP register packet is repeatedly transferred from one NHS to another until it reaches the NHS-1. After receiving the NHRP register packet, the NHS-1 accepts this NHRP register packet that has been transmitted from the ATM terminal managed thereby and registers a pair, of an IP address and an ATM address derived from the NHRP register packet, in its own cache in preparation for an inquiry made by other ATM terminals.

When the ATM terminal is required to resolve an address of a communicating party, the NHRP request packet is transmitted to the NHS based on the ANYCAST address. Subsequent operation for processing the NHRP request packet is the same as that of the prior art.

A second embodiment of the present invention is explained.

Figure 2:
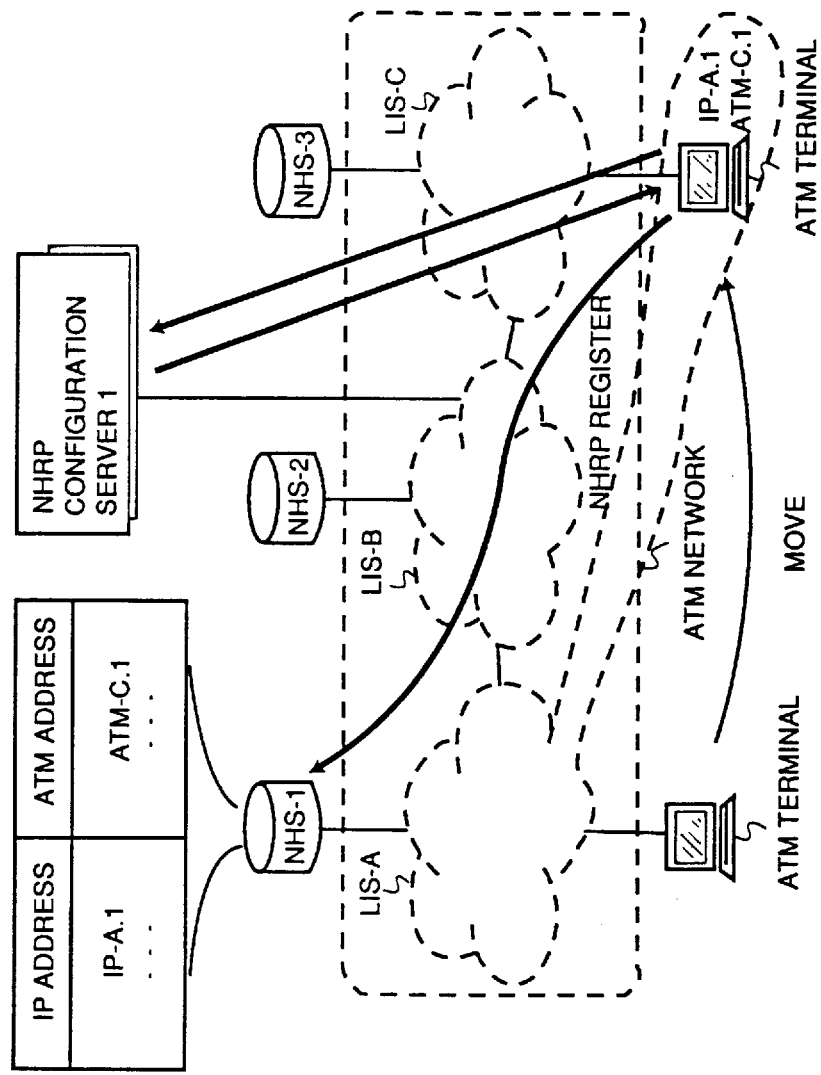
FIG. 2 shows a second embodiment of the invention.

Referring to FIG. 2, a person serving as a network manager has preset the "IP address, ATM address and LIS managed by the NHS" of all NHS's on the ATM network in an NHRP configuration server 1. An ANYCAST address of the NHRP configuration server has also been preset.

In the second embodiment, regardless of the switch of the LIS connected to the ATM terminal, the same operation is executed.

The ATM terminal accesses the NHRP configuration server 1 based on the ANYCAST address and inquires for an IP address and an ATM address of the NHS that manages the ATM terminal. Responding to the inquiry, the NHRP configuration server 1 returns the IP address and the ATM address of the NHS-1 to the ATM terminal.

The ATM terminal then transmits an NHRP register packet and an NHRP request packet based on the acquired IP address and ATM address. This operation is executed in the same manner as in the prior art.

When the ATM terminal detects that the NHRP register packet and the NHRP request packet cannot be transmitted based on the acquired IP address and the ATM address, it is assumed that the ATM address of the NHS-1 has been changed. In this case, the ATM terminal accesses the NHRP configuration server 1 again based on the ANYCAST address and acquires an IP address and an ATM address of the NHS. In the second embodiment, when the NHS has been physically moved, the network administrator should set the information on new "IP address, ATM address and LIS managed by the NHS" to the NHRP configuration server.

Figure 3:
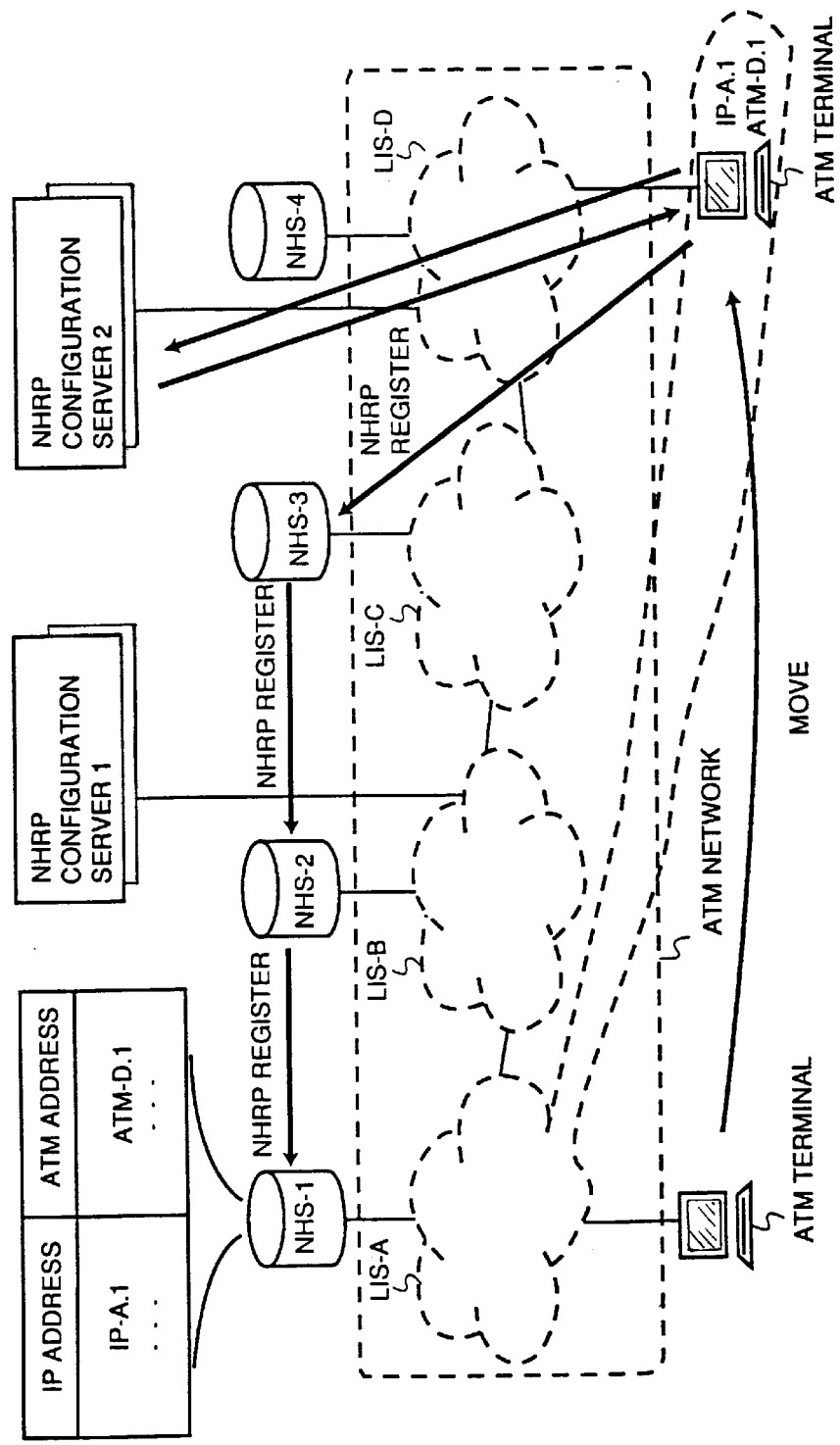
FIG. 3 shows a third embodiment of the invention.

Next a third embodiment is explained. In FIG. 3, the network manager distributes and sets in advance the information on "IP address, ATM address and LIS managed by the NHS" of all NHS's on the ATM network to the NHRP configuration servers 1 and 2. For example, the information on the NHS-1 and NHS-2 is set to the NHRP configuration server 1 and the information on the NHS-3 and NHS-4 is set to the NHRP configuration server 2. An ANYCAST address of an NHRP configuration server is also assumed to be allocated.

First, the operation when the ATM terminal is connected to a switch belonging to the LIS-A is explained.

The ATM terminal accesses the nearest NHRP configuration server 1 based on the ANYCAST address and inquires for an IP address and an ATM address of the NHS that manages the ATM terminal. Responding to the inquiry, the NHRP configuration server 1 returns the IP address and the ATM address of the NHS-1 to the ATM terminal.

The subsequent operation of the ATM terminal is executed in the same manner as in the second embodiment.

Next, the operation when the ATM terminal has been physically moved, for example, to a switch belonging to the LIS-D, but the ATM terminal is still indentified belonging to the LIS-A is explained.

The ATM terminal accesses the nearest NHRP configuration server, namely NHRP configuration server 2, based on the ANYCAST address and inquires for an IP address and an ATM address of the NHS that manages the ATM terminal. Responding to the inquiry because, the NHRP configuration server 2 holding no information concerning the ATM therein, it returns the IP address and the ATM address of the nearest NHS, i.e., the NHS-3 to the ATM terminal.

The ATM terminal then transmits an NHRP register packet and an NHRP request packet based on the acquired IP address and ATM address.

The NHS-3 receives but rejects the NHRP register packet from the ATM terminal because the NHRP register packet has not been transmitted from an ATM terminal managed by the NHS-3. Instead, the NHS-3 transfers the NHRP register packet in the same way as the first embodiment. The NHRP register packet is repeatedly transferred from one NHS and to another until the NHRP register packet reaches the NHS-1. The NHS-1 receives and accepts the NHRP register packet because an NHRP register packet has been transmitted from the ATM terminal managed thereby and then registers a pair of an IP address and an ATM address derived from the NHRP register packet in its own cash in preparation for an inquiry made by other terminals.

Next, a fourth embodiment is explained.

Figure 4:
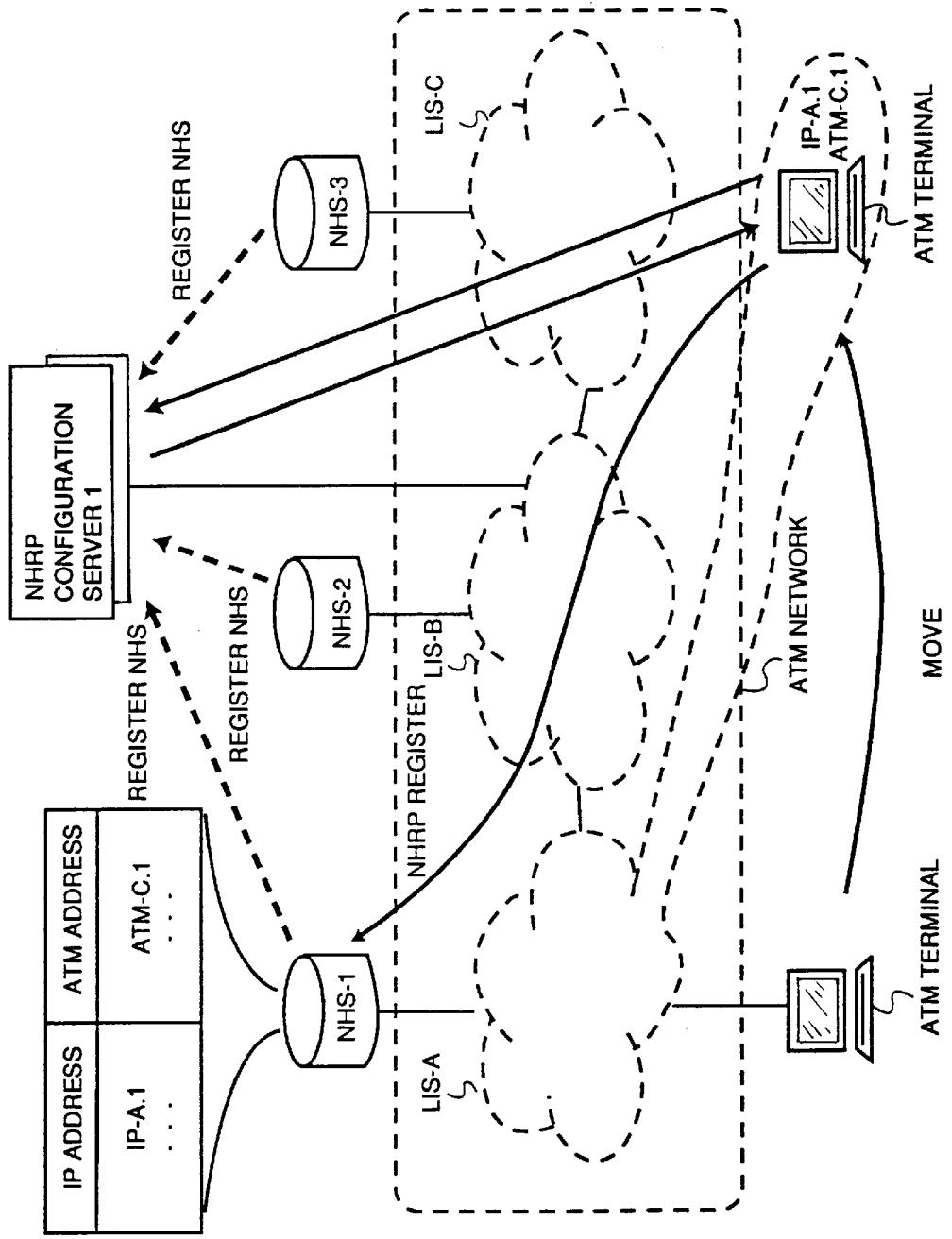
FIG. 4 shows a fourth embodiment of the invention.

In FIG. 4, an ANYCAST address for an NHRP configuration server is assumed to be allocated.

All the NHS's on the ATM network automatically register their own information on "IP address, ATM address and LIS managed by the NHS" in the NHRP configuration server 1 based on the ANYCAST address. The register operation is executed at regular intervals or only when each NHS detects the change in the information of its own.

The subsequent operation is executed in the same manner as in the second embodiment.

Next a fifth embodiment is explained.

Figure 5:
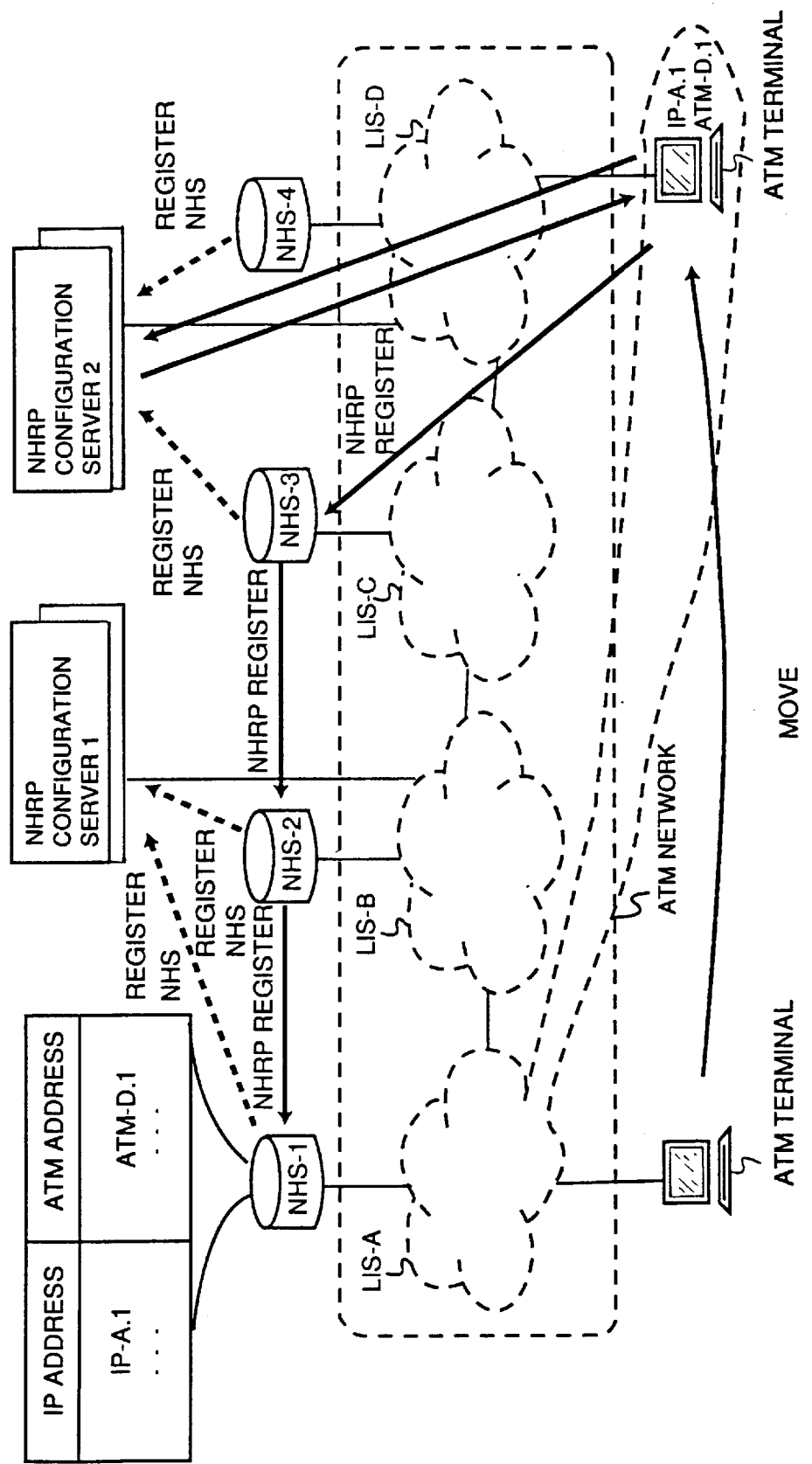
FIG. 5 shows a fifth embodiment of the invention.
Figure 6:
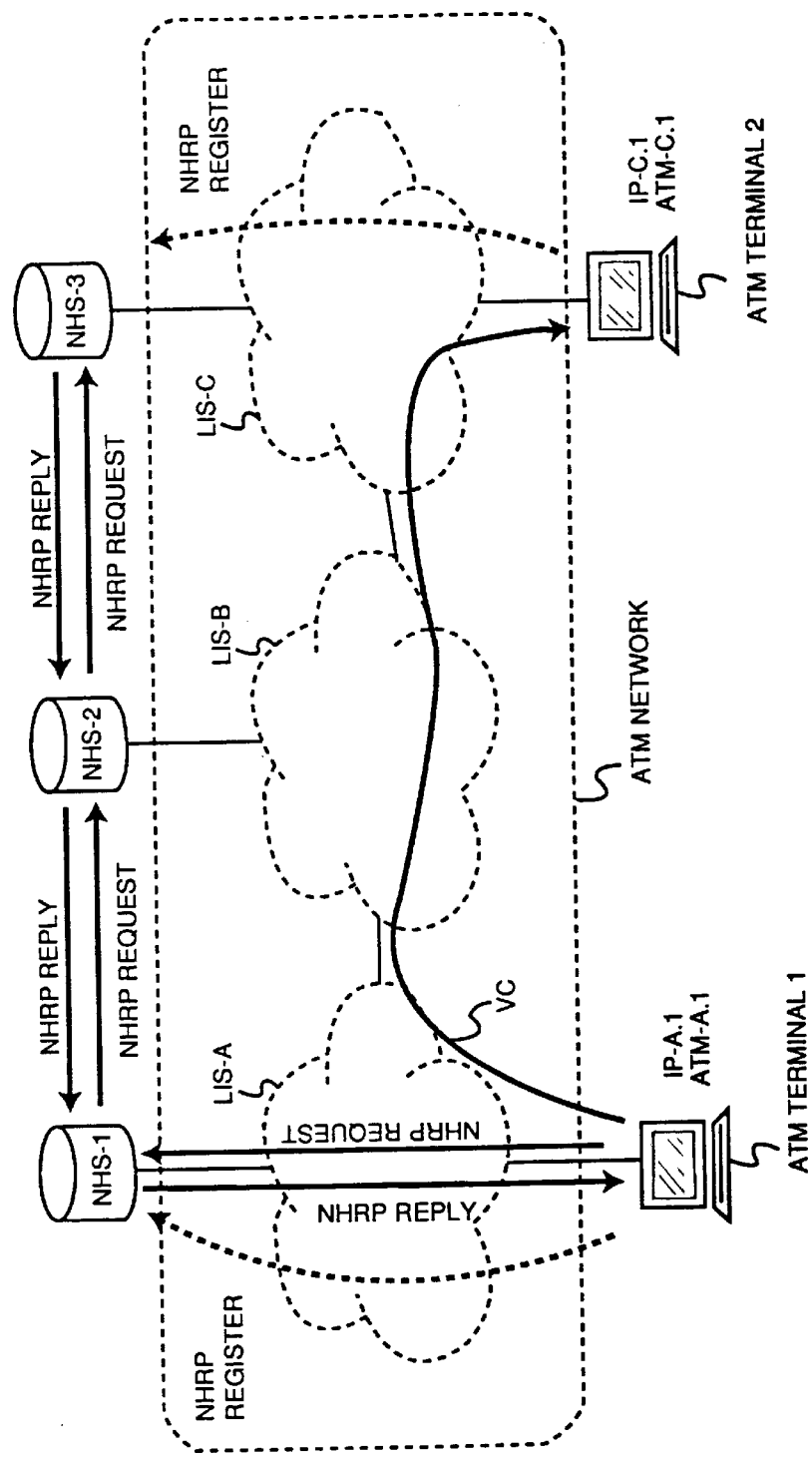
FIG. 6 shows a prior art system of address resolution.

In FIG. 5, an ANYCAST address of an NHRP configuration server is assumed to be allocated.

All the NHS's on the ATM network automatically register their own information on "IP address, ATM address and LIS managed by the NHS" in the nearest NHRP configuration server based on the ANYCAST address. In FIG. 5, for example, the NHS-1 and NHS-2 register the information in the NHRP configuration server 1 and the NHS-3 and NHS-4 register the information in the NHRP configuration server 2. The register operation is executed at a regular interval or only when each NHS detects the change in the information of its own.

The subsequent operation is the same as the third embodiment.

Next a sixth embodiment is explained.

In FIG. 1 to FIG. 5, each of the ATM terminal, NHS and NHRP configuration server operates in the same manner as in the first embodiment to the fifth embodiment, respectively. An ATM terminal also adds authentication information to an NHRP register packet based on a predetermined authentication means prior to transmitting the NHRP register packet to the NHS.

An NHS receives the NHRP register packet with the authentication information transmitted from the ATM terminal. The NHS that received the NHRP register packet judges whether the received NHRP register packet has been transmitted from the ATM terminal managed thereby.

When the NHS determines that the NHRP register packet has been transmitted from the ATM terminal managed thereby, the NHS checks whether an illegal ATM terminal has sent the NHRP register packet based on the added authentication information. In the case of illegal registration, the NHS discard the NHRP register packet.

When the NHS determines that the NHRP register packet has not been transmitted from the ATM terminal managed thereby, the added authentication information is ignored and the NHRP register packet is transferred in the same way as those embodiments from 1 to 5. The NHRP register packet is repeatedly transferred from one NHS and to another until the NHRP register packet reaches the NHS that manages the ATM terminal and then the NHS executes the authentication operation.

As explained above, in the address resolution method of the present invention, even if an ATM address has been changed for some reason, for example, owing to physical movement of the NHS to another ATM switch, the ATM terminal can transmit an NHRP packet to the NHS that manages the ATM terminal. Therefore, proper address resolution can be executed.

Moreover even if the ATM terminal has been physically moved, the NHRP register packet can be effectively transmitted to the NHS that manages the ATM terminal. Therefore, proper address resolution can be executed.

Furthermore means for authenticating the physically moved ATM terminal has been established, resulting in correct authentication of the physically moved ATM terminal.

What is claimed is:

1. An address resolution method for resolving the location of an ATM terminal using an NBMA Next Hop Resolution Protocol(NHRP) in an Asynchronous Transfer Mode (ATM) network connected to a plurality of NHRP servers and ATM terminals, each of said NHRP servers for managing at least a respective one of said ATM terminals, said address resolution method comprising the steps of:

transmitting, by one of said ATM terminals, an NHRP register packet to a respective one of said NHRP servers, said register packet comprising an ATM address and an IP address of said ATM terminal;

receiving, by said respective NHRP server said NHRP register packet from said ATM terminal and accepting said NHRP register packet when said NHRP server manages said ATM terminal; and transferring said received register packet to another of said NHRP servers that manages said ATM terminal when said respective NHRP server does not manage said ATM terminal.

2. The address resolution method of claim 1, wherein said ATM terminal transmits authentication information with said NHRP register packet and said NHRP server ignores said authentication information prior to transferring said register packet to said another NHRP server that manages said ATM terminal when said NHRP server does not manage said ATM terminal; and further comprising the step of authenticating with said authentication information and discarding said NHRP register packet upon detecting an error when said NHRP server receiving said register packet manages said ATM terminal.

3. An address resolution method for resolving the location of an ATM terminal using an NHRP (NBMA Next Hop Resolution Protocol) in an ATM (Asynchronous Transfer Mode) network connected to a plurality of NHRP servers and ATM terminals, each of said NHRP servers for managing at least a respective one of said ATM terminals, said address resolution method comprising the steps of:

establishing an NHRP configuration server holding IP addresses, ATM addresses and corresponding logical subnet numbers of said NHRP servers;

accessing, by one of said ATM terminals connected to said ATM network, said NHRP configuration server to acquire an IP address and an ATM address of an NHRP server that manages said ATM terminal; and transmitting, by said ATM terminal, an NHRP register packet to an NHRP server specified by said IP address and said ATM address acquired by said ATM terminal, said register packet comprising an ATM address and an IP address of said ATM terminal.

4. The address resolution method of claim 3, further comprises a step for holding a new ATM address of an NHRP server in said NHRP configuration server when said ATM address of said NHRP server has been changed.

5. The address resolution method of claim 3, wherein said ATM terminal transmits authentication information with said NHRP register packet; and further comprising the steps of: ignoring, by said NHRP servers, said authentication information and transferring said register packet to another NHRP server that manages said ATM terminal when said NHRP server receiving said register packet does not manage said ATM terminal; and authenticating said authentication information and discarding said NHRP register packet upon detecting an error when said NHRP server manages said ATM terminal.

6. An address resolution method for resolving the location of an ATM terminal using an NHRP (NBMA Next Hop Resolution Protocol) in an ATM (Asynchronous Transfer Mode) network connected to a plurality of NHRP servers and ATM terminals, each of said NHRP servers for managing at least a respective one of said ATM terminals, said address resolution method comprising the steps of:

establishing a plurality of NHRP configuration servers each holding IP addresses, ATM addresses and corresponding logical subnet numbers of respective ones of said NHRP servers;

accessing, by one of said ATM terminals connected to said ATM network, a respective one of said NHRP configuration servers, to acquire an IP address and an ATM address of an NHRP server that manages said ATM terminal;

transmitting, by said accessed NHRP configuration servers, an IP address and an ATM address of another NHRP server to said ATM terminal when said NHRP configuration server does not hold said IP address and said ATM address of said NHRP server that manages said ATM terminal;

transmitting, by said ATM terminal, an NHRP register packet to said another NHRP server specified with said IP address and said ATM address acquired by said ATM terminal; and transferring, by said another NHRP servers, an NHRP register packet from said ATM terminal to said NHRP server that manages said ATM terminal.

7. The address resolution method of claim 6, further comprises the step of registering a new ATM address of an NHRP server to said NHRP configuration server when said ATM address of said NHRP server has been changed.

8. The address resolution method of claim 6, wherein said ATM terminal transmits authentication information with said NHRP register packet; and said another NHRP server receives said register packet, ignores said authentication information and transfers said register packet to said NHRP server that manages said ATM terminal; and said NHRP server receives said register packet, with said authentication information and discards said NHRP register packet upon detecting an error.

9. An ATM network using an NHRP for address and configuration resolution, said ATM network comprising:

at least one ATM terminal connected to said ATM network for transmitting an NHRP register packet comprised of an ATM address and an IP address of said ATM terminal; and a plurality of NHRP servers each for transferring said NHRP register packet to another of said NHRP servers that manages said ATM terminal when said each NHRP server does not manage said ATM terminal.

10. The ATM network of claim 9, wherein said ATM terminal transmits authentication information with said NHRP register packet; and each of said NHRP servers, upon receiving said NHRP register packets, ignores said authentication information and transfers said register packet to said another NHRP server that manages said ATM terminal when said each NHRP server does not manage said ATM terminal; and each of said NHRP services executes authentication using said authentication information, and discards said NHRP register packet upon detecting an errors, when said each NHRP server manages said ATM terminal.

11. An ATM network using an NHRP for an address and configuration resolution, said network comprising:

a plurality of NHRP servers;

an NHRP configuration server for holding IP addresses, ATM addresses and corresponding logical subnet numbers of all NHRP servers connected to an ATM network;

and at least one ATM terminal for acquiring an IP address and an ATM address of an NHRP server that manages said ATM terminal by accessing said NHRP configuration server and for transmitting an NHRP register packet to said NHRP server specified by said IP address and said ATM address, said register packet comprising said IP address and said ATM address of said ATM terminal.

12. The ATM network of claim 11, wherein:

said ATM terminal transmits authentication information with said NHRP register packet; and each of said NHRP servers, upon receiving an NHRP register packet, ignores said authentication information and transfers said register packet to said NHRP server that manages said ATM terminal when said each NHRP server does not manage said ATM terminal; and said each NHRP server executes authentication with said authentication information and discards said NHRP register packet upon detecting an error when said each NHRP server manages said ATM terminal.

13. An ATM network using an NHRP for address and configuration resolution, said ATM network comprising:

at least one ATM terminal for transmitting an NHRP register packet comprised of an ATM address and an IP address of said ATM terminal;

an NHRP server for transferring said NHRP register packet to another NHRP server that manages said ATM terminal; and a plurality of NHRP configuration servers each for holding IP addresses, ATM addresses and corresponding logical subnet numbers of respective ones of said NHRP servers connected to said ATM network, wherein said ATM terminal accesses a respective one of said NHRP configuration servers to acquire an IP address and an ATM address of an NHRP server that manages said ATM terminal;

said NHRP configuration server transmitting an IP address and an ATM address of another NHRP server when said NHRP configuration server does not hold said IP address and said ATM address of said NHRP server that manages said ATM terminal;

said ATM terminal transmitting an NHRP register packet to said NHRP server specified with said IP address and said ATM address acquired by said ATM terminal; and said another NHRP server transferring said NHRP register packet from said ATM terminal to said NHRP server that manages said ATM terminal.

14. The ATM network of claim 13, wherein said ATM terminal transmits authentication information with said NHRP register packet; and each of said plurality of NHRP servers, upon receiving said NHRP register packet, ignores said authentication information and transfers said register packet to said NHRP server that manages said ATM terminal when said each NHRP server does not manage said ATM terminal and executes authentication with said authentication information and discards said NHRP register packet upon detecting an error when said each NHRP server manages said ATM terminal.

* * * * *